United States Patent
Kozloski et al.

(10) Patent No.: US 11,282,005 B2
(45) Date of Patent: Mar. 22, 2022

(54) SELECTING A PLURALITY OF INDIVIDUALS AND AI AGENTS TO ACCOMPLISH A TASK

(71) Applicant: International Business Machines Corporation, Armonk, NY (US)

(72) Inventors: James R. Kozloski, New Fairfield, CT (US); Clifford A. Pickover, Yorktown Heights, NY (US); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1165 days.

(21) Appl. No.: 14/941,713

(22) Filed: Nov. 16, 2015

(65) Prior Publication Data

US 2017/0140322 A1    May 18, 2017

(51) Int. Cl.
| | |
|---|---|
| *G06Q 10/00* | (2012.01) |
| *G06Q 10/06* | (2012.01) |
| *G06N 5/04* | (2006.01) |
| *G06N 7/00* | (2006.01) |
| *G06N 20/00* | (2019.01) |

(52) U.S. Cl.
CPC ..... *G06Q 10/063112* (2013.01); *G06N 5/043* (2013.01); *G06N 7/005* (2013.01); *G06N 20/00* (2019.01)

(58) Field of Classification Search
CPC combination set(s) only.
See application file for complete search history.

(56) References Cited

U.S. PATENT DOCUMENTS

| | | |
|---|---|---|
| 6,632,174 B1 | 10/2003 | Breznitz |
| 7,483,841 B1 * | 1/2009 | Jin .................. G06Q 10/06 705/7.11 |
| 7,887,329 B2 | 2/2011 | Greenshpan |
| 8,694,350 B1 | 4/2014 | Cohen et al. |
| 8,762,305 B1 | 6/2014 | Chelian |

(Continued)

FOREIGN PATENT DOCUMENTS

WO    2004006747 A2    3/2004

OTHER PUBLICATIONS

"Elastic Maps and Nets for Approximating Principal Manifolds and Their Application to Microarray Data Visualization," 2008, in "Principal Manifolds for Data Visualization and Dimension Reduction," vol. 1, pp. 96-130). (Year: 2008).*

(Continued)

*Primary Examiner* — Hafiz A Kassim
*Assistant Examiner* — Scott M Ross
(74) *Attorney, Agent, or Firm* — Peter Edwards, Esq.; McGinn I.P. Law Group, PLLC.

(57) ABSTRACT

The present invention provides a method, system, and computer program for selecting a plurality of workers to accomplish a task. The method includes: identifying a task from a description; extracting at least one cognitive skill from the description of the task using machine learning methods; generating a group cognitive map which includes the at least one cognitive skill; and selecting a plurality of workers to accomplish the task based on at least the group cognitive map, wherein the plurality of workers comprises at least on artificial intelligent (AI) agent.

13 Claims, 5 Drawing Sheets

(56) References Cited

U.S. PATENT DOCUMENTS

| | | | |
|---|---|---|---|
| 2010/0332281 A1* | 12/2010 | Horvitz | G06Q 10/06311 |
| | | | 705/7.13 |
| 2013/0090963 A1* | 4/2013 | Sharma | G06Q 10/063112 |
| | | | 705/7.13 |
| 2013/0260357 A1 | 10/2013 | Reineman-Jones | |
| 2013/0317873 A1* | 11/2013 | Kozloski | G06Q 10/109 |
| | | | 705/7.19 |
| 2014/0188787 A1 | 7/2014 | Balamurugan et al. | |
| 2015/0170084 A1* | 6/2015 | Byron | G06Q 10/06316 |
| | | | 705/7.26 |

OTHER PUBLICATIONS

Chatbot in education—An useful "Virtual Teaching Assistant"—by content| Sep. 21, 2020|, pp. 1-6, https://fpt.ai/chatbot-education-useful-virtual-teaching-assistant (Year: 2020).*

* cited by examiner

SELECTING A PLURALITY OF INDIVIDUALS AND AI AGENTS TO ACCOMPLISH A TASK

FIELD OF THE INVENTION

The present invention is related to accomplishing a task with a plurality of workers. More particularly, the present invention is related to using artificial intelligent (AI) agents to assist in complementing the skills of a plurality of workers to accomplish a task.

BACKGROUND OF THE INVENTION

Several jobs and projects require a various number of cognitive skills to accomplish the given job and/or project. Skills of an individual are generally identified by evaluating their prior work. Cognitive skills are each individual's innate or intuitive based skills that are carded out in any task. Cognitive skills have to do with the mechanisms of how we learn, remember, problem-solve, and pay attention rather than with any actual knowledge individuals may have acquired in education or previous jobs There have been previous methods of matching a person's cognitive skill to a task by training a given individual to improve abilities. These systems only measure and analyze mental abilities, and they fall short of attempting to compliment the abilities of workers so that the task can be accomplished more efficiently. Many systems do not asses the cognitive ability of each worker in a group and recognize the need for an additional cognitive ability. Therefore, in order to complement some of the cognitive abilities of individuals, the use of artificial intelligent agents can be quicker and more cost-effective.

SUMMARY OF THE INVENTION

One aspect of the present invention provides a method for selecting a plurality of workers to accomplish a task. The method includes: identifying a task from a description; extracting at least one cognitive skill from the description of the task using machine learning methods; generating a group cognitive map which includes the at least one cognitive skill; and selecting a plurality of workers to accomplish the task based on at least the group cognitive map, wherein the plurality of workers comprises at least on artificial intelligent (AI) agent.

Another aspect of the present invention provides a system for selecting a plurality of workers to accomplish a task. The system comprising: a memory; a processor coupled to the memory; and a cognitive skill selector module coupled to the memory and the processor, wherein the cognitive skill selector module performs the steps of a method include: identifying a task from a description; extracting at least one cognitive skill from the description of the task using machine learning methods; generating a group cognitive map which includes the at least one cognitive skill; and selecting a plurality of workers to accomplish the task based on at least the group cognitive map, wherein the plurality of workers comprises at least on artificial intelligent (AI) agent.

Another aspect of the present invention provides a computer program product for selecting a plurality of workers to accomplish a task, the computer program product comprising a computer readable storage medium having program instructions embodied therewith, wherein the computer readable storage medium is not a transitory signal per se, the program instructions executable by a processor to cause the processor performs the steps of the method described above.

BRIEF DESCRIPTION OF THE DRAWINGS

The subject matter which is regarded as embodiments is particularly pointed out and distinctly claimed in the claims at the conclusion of the specification. The forgoing and other features and advantages of the embodiments are apparent from the following detailed description taken in conjunction with the accompanying drawings in which:

DETAILED DESCRIPTION OF THE PREFERRED EMBODIMENTS

Figure 1:
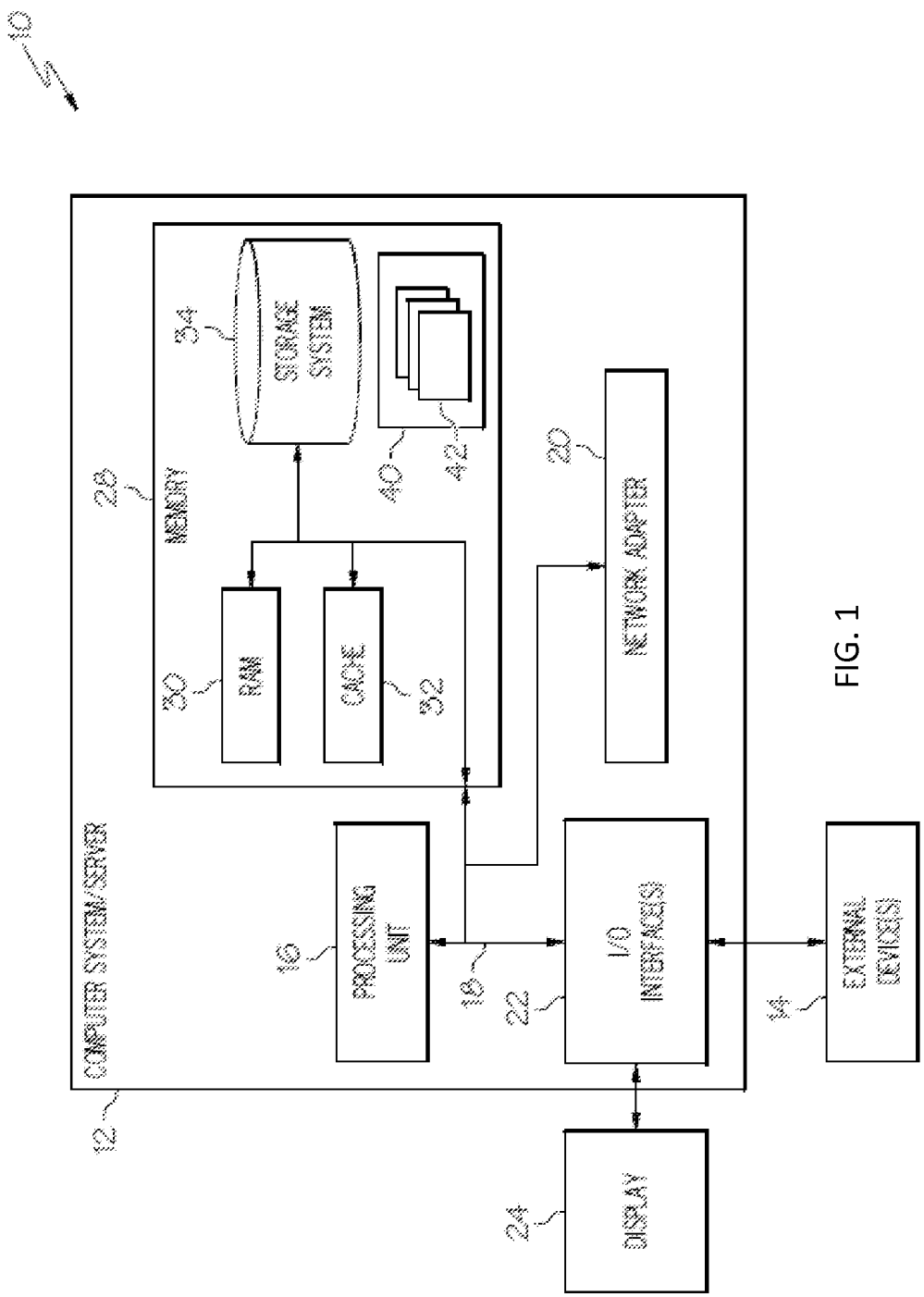
FIG. 1 depicts a cloud computing node according to an embodiment of the present invention.

The present invention provides a method, system, and apparatus for selecting a plurality of workers to accomplish a task, in which the plurality of workers includes at least one artificial intelligent (AI) agent.

Some embodiments of the invention can be implemented in a cloud computing environment. Specifically, for example selecting the plurality of workers from a crowd of individuals that are connected via a cloud interface.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
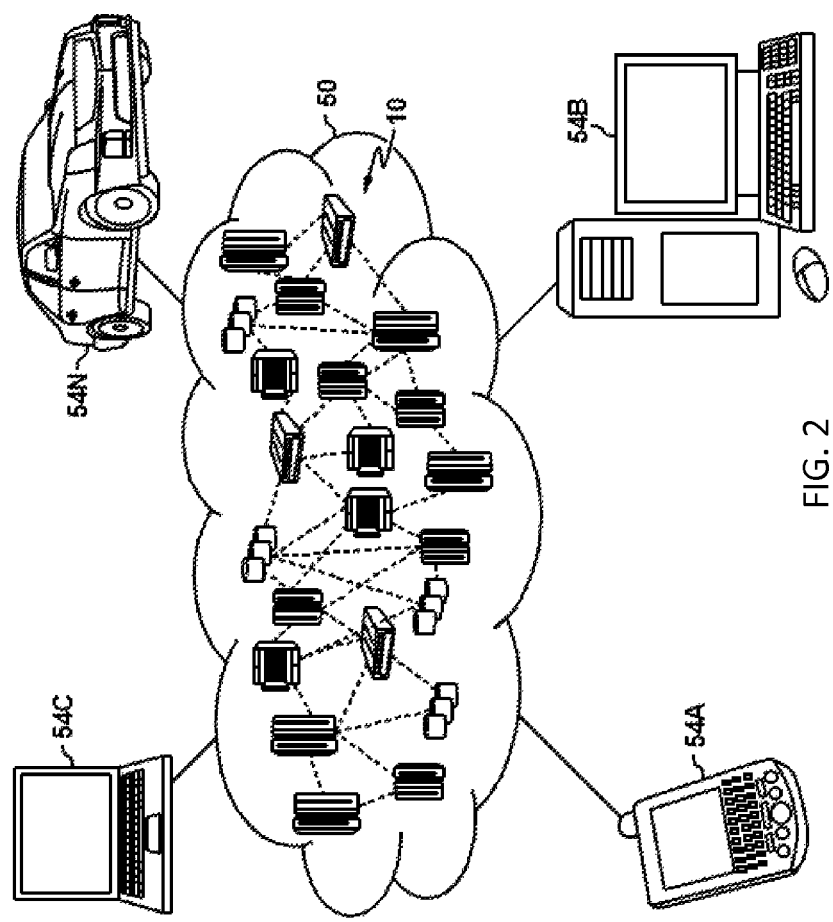
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
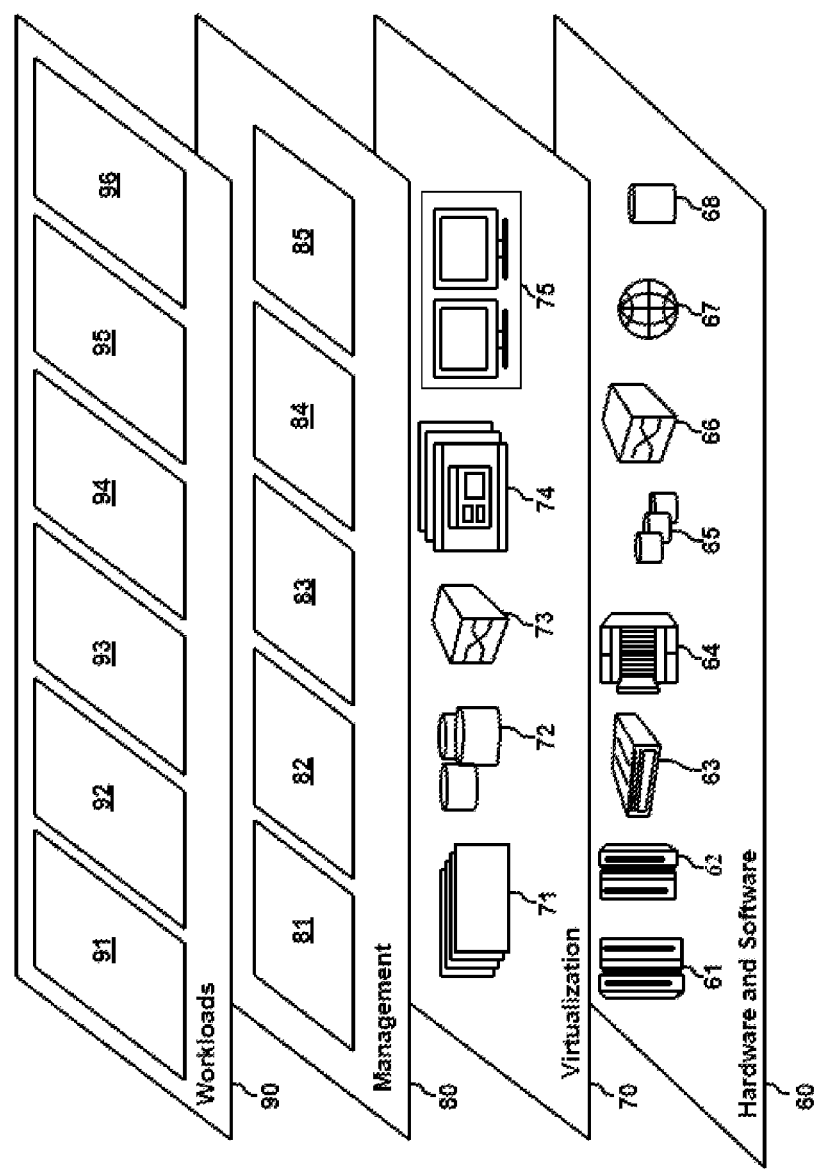
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cognitive skill selector 96. The cognitive skill selector can select the cognitive skills it needs from individuals and/or artificial agents to accomplish the task.

Figure 4:
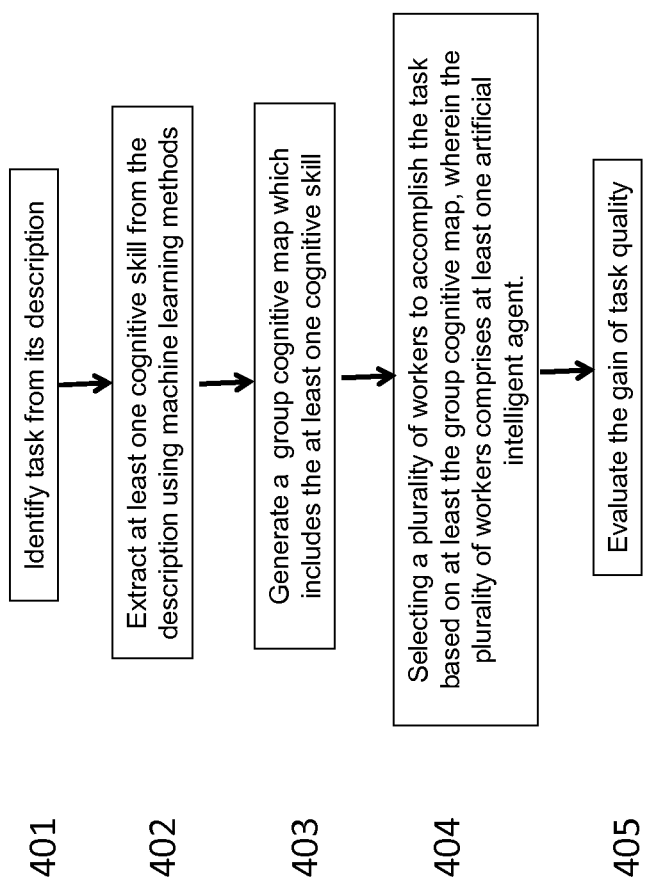
FIG. 4 depicts the methodology of the present invention according to an embodiment of the present invention.

FIG. 4 depicts a flowchart of the method of selecting a plurality of workers to accomplish a task according to the present invention. The first step 401, is to identify a task from a description. The description can be presented in any form known in the relevant art. Accordingly, a description can be, but is not limited to, statement of work contract, proposal, a department's objectives, a submitted description and/or any other method of describing a task known in the relevant art. In step 401, the task that is identified can be a specific short-term task or a broad long-term task. For example, a task can be filing a patent application to building a new railroad system.

Referring to FIG. 1, the next step 402 is to extract at least one cognitive skill from the description of the task using machine learning methods. The system uses machine learning methods, which can be, but are not limited to, latent Dirchlet allocation, natural language processing, and/or automatic question and answer processing, and/or any other machine learning method known in the relevant art.

Referring to step 402, the cognitive skills that are extracted can be any skill that defines the ability of an entity or human to process thoughts and critical thinking skills. These cognitive skills include but are not limited to motor skills, complex/continuous motor skills, time required to move the stimulus, movement smoothness, complex eye hand coordination, hand-hand coordination, and/or eye-foot coordination. The system can include a database for storing such skillset where the data may relate to cognitive norms, hand-eye coordination, smooth movement, spatial orientation, route planning, mental rotation, speed/distance/time estimation, visual search, attention allocation/focusing, distractibility, split attention, scene perception, simple and choice reaction time, decision-making, risk-taking, short-term memory (STM), location memory, memory for names, information encoding strategies, retrieval from long-term memory (LTM), response to time pressure (TP), ability to inhibit planned action, problem-solving, and linguistic skills.

According to an embodiment of the present invention, natural language processing is a machine learning method used to identify the cognitive skills needed to accomplish a task. Natural language processing is the process of translating natural language input into a computer/artificial language. Accordingly, a description can be processed so that the system can understand the description and extract the given task specified in the description.

According to another embodiment of the present invention, Latent Dirchlet Allocation (LDA) is used to extract the at least one cognitive skills necessary to accomplish the test. Latent Dirchlet Allocation is the process of classifying text content to an associated category. This can be, but is not limited to, text classification based on statistical method and text classification method based on Bayesian text classification.

Accordingly, a description can be classified according to previous tasks that have been classified and associated with specific category of tasks. For example, writing an original patent application verses writing an office action. More specifically, LDA can preclude the use of a bag of words approach, each text as a word frequency-to-model digital information. Each article text represents a probability distribution of some of the topics posed, and each topic, they also represent a lot of words posed probability distribution.

Another embodiment of the present invention can use question and answering (Q&A) system to extract at least one cognitive skill from the description. Question and answering system outputs an answer itself if a question sentence expression in a natural language is inputted.

Referring to FIG. 4, the next step 403 is to generate a group cognitive map that includes the at least one cognitive skill. The group cognitive map involves mapping from a set of cognitive skills that have been extracted from the description.

Referring to FIG. 4, the next step 404 is to select a plurality of workers to accomplish the task based on at least the group cognitive map, wherein the plurality of workers includes at least one artificial intelligent (AI) agent. The given set of workers can range from a small finite group to a large indefinite number. The workers can range from being inputted into a database or can be selected from a varying social networking website. For example, it can be the employees associated to a specific department, the graduating class from a certain school, and/or it can be all of the members who are participants to a social networking website (i.e. LinkedIn).

According to the present invention, the cognitive skills of individuals are determined using methods known in the relevant art to determine the at least one cognitive skill of each worker. Methods of determining the cognitive skills of each worker can be, but are not limited to, testing the preliminary cognitive level of a worker, analyzing their profiles on various social media websites, and/or crowdsourcing methods known in the relevant area. Furthermore, cognitive skills can be extracted from the already completed tasks/crowdsourcing repositories and/or by active monitoring of a user, during their interaction with systems(s)/agent (s) and other humans. Furthermore, cognitive skills can be determined by mining a log of user activities and correlating it to the taxonomy that brings together skills and tasks.

According to another embodiment of the present invention, the system can supply "tags" that specify one or more cognitive skills that are likely to be useful and/or necessary to accomplish the task. These tags can be generated automatically according to the description of the task or a user can input such tags. Furthermore, the tags associated with the cognitive skills can change over time if the cognitive skills required to accomplish the task change over time For example, the task can be to develop a gaming program for a specific game environment. For this specific task 3D spatial skills are a necessary skill to accomplish the task. As a result, a tag for "3D spatial skills" can be supplied by the system to assist in selecting the workers to accomplish the task.

According to the present invention, the plurality of workers includes at least one artificial intelligent (AI) agent. Typically the at least one AI agent compliments the cognitive skill of the human workers so that the task can be completed efficiently. Complimentary AI agents can be generated from a template, wherein certain knowledge bases and capabilities may be removed in order to not overlap with existing capabilities of humans in the subset.

According to the present invention, several tasks rely on the skills of more than one AI/human agent. Identifying at least one "complimentary AI" agent to include in the subset is useful for tasks that call for collaborative approach and bring together digital and human intelligence. For example, if a team of workers is deficient in language processing in a particular language such as French, an AI agent can be enlisted to complement the team's skills.

AI planning technology can be applied to create agents/ agent capabilities. Based on the user context and goal, AI planning can assemble a sequence of actions that agent can execute to achieve a certain goal.

Referring to FIG. 4, the next step 405 according to an embodiment of the present invention is evaluating the gain of task quality according to known methods in the relevant art. The task quality is the overall evaluation of the probability of the task being accomplished in the given time and meeting the given parameters. This can be based on but not limited to the team configuration, given skillset, and risk of each member, and/or marketplace conditions.

According to an embodiment of the present invention, decision theory can be used to evaluate the gain of the task quality. Decision theory requires systems makes a decision about whether to engage a certain team member or not. The success is determined by the realized percentage of agents/team members who perform the tasks exceeding a threshold.

According to an embodiment of the present invention, after evaluating the gain of task quality the present invention provides a confidence value (C) for the task. The confidence value represents the likelihood that the task will be completed on time within the given parameters. Such parameters include but are not limited to budget; deadline; location; weather and etc.

According to another embodiment of the present invention, there is a continuous evaluation of the gain of task quality. According to the present invention, the system can recommend changing the plurality of workers based on the gain of the task quality. This can be performed via methods known in the relevant art.

The continuous evaluation can also change the confidence value and alert the supervisor(s) of the task to make specific changes to the task so that the task is accomplished according to the given requirements. This alert can be triggered if the confidence level drops below a certain threshold. Accordingly, the present invention can also provide recommendations of changes to be made to the plurality of workers so that the confidence level stays above a given threshold.

In another embodiment of the present invention, the confidence value can recommend adding an AI agent to assist in team building. More specifically, if C is deficient in compatibility, meeting productivity, and/or group dynamics, the AI agent can assist in determining proactive activities to assist in team building. For example, the AI agent could be added to assist by offering suggestions for forming, storming, norming, and performing based on its intelligent knowledge of psychology, team building, and group dynamics.

Figure 5:
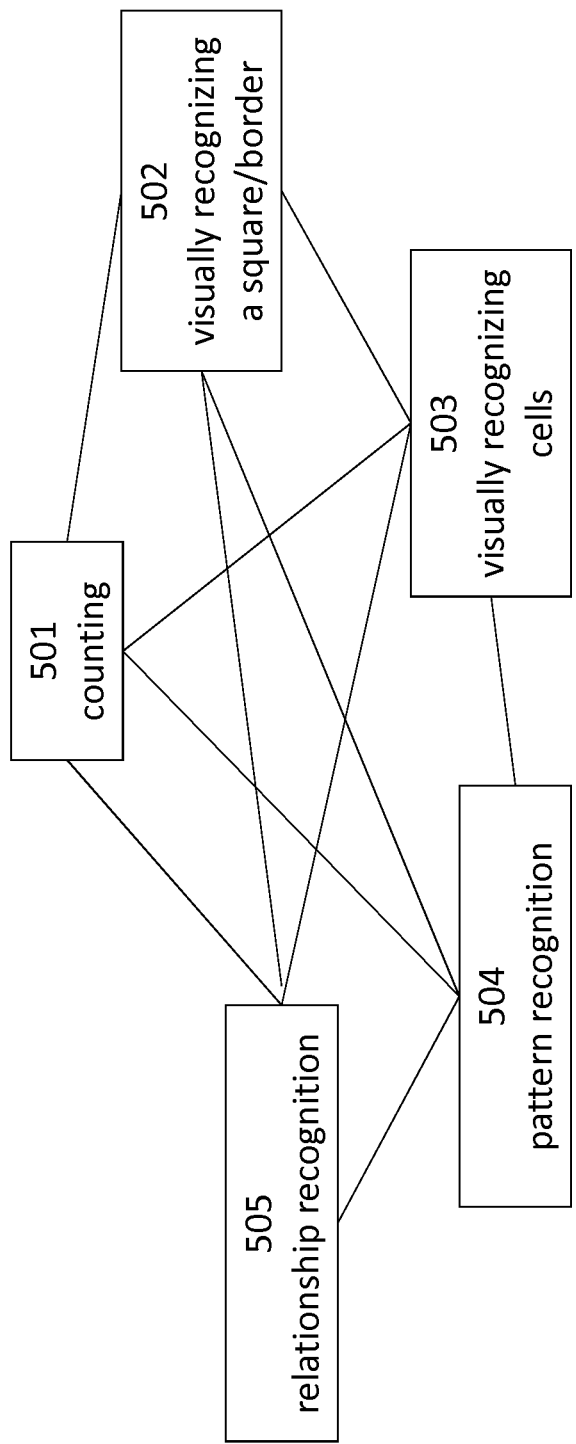
FIG. 5 depicts an example of a cognitive map according to an embodiment of the present invention.

FIG. 5 depicts a group cognitive map according to an embodiment of the present invention. For example, according to FIG. 5 the task is identified as counting the number of infected blood cells on an image. The skills necessary can be counting, visually recognizing a square/border, visually revognixzng cells, pattern recognition, and/or relationship recognition. FIG. 5a shows a cognitive map at the beginning of the task. FIG. 5b shows the cognitive map after a period of time.

The group cognitive map is represented in an abstract continuous metric space, such that semantic relations among representations are reflected in geometric relations in the indexing space. For example, in a spatial cognitive map, the metrics may be proportional to the perceived distances between associated landmarks in the physical world. In this case, the cognitive map is essentially a model of perceived space.

According the present invention, as the time of the task proceeds the cognitive map can change according to the selected plurality of workers' skills. Cognitive map is continuously updated based on the feedback/skills observed (their level of competence) and tasks completed as shown in FIG. 5. This will allow the supervision of the task to determine whether a change needs to be made to the selected plurality of workers.

According to the present invention, the description can include but is not limited to the location, size, capacity, budget, specific requirements, design limitations/preferences, licensing limitations, legal limitations, various technical/skills that are used to accomplish, timeline and/or other areas that affect the task. Determining the description of the task can be submitted to the system and/or be automatically evaluated a task. To be submitted a user can merely submit a specification to the system. The task can also be generated by the system. For example, if there is an ongoing task, and then the system realizes there is a second task to be accomplished as well, the system can automatically generate a task.

According the present invention, there are several different parameters that can be used to select the plurality of workers. This includes, budget, timeline, location, weather.

In another embodiment the system selects the optimal workers from a larger set of workers to accomplish a task. Accordingly, the present invention can generate an iterative loop over a network to incorporate specific parameters of the task to determine of the optimal worker for a task. The network may parameterize worker links (edges) with compatibility scores between the various workers (nodes), and can be inserted into a data space of tasks for an order embedding algorithm for nonlinear dimensionality reduction. Examples of an order embedding algorithm include an elastic map, a Sammon's map, a Kohonen map, or a combination thereof. Next, association linkages are associated between a worker and at least one pair of data points in the data space, each association link representing a different cognitive skill requirement's likeness to the cognitive skill of a worker. A total energy of the order embedding algorithm is computed.

For example, the total energy can be computed as a sum of an approximation energy related to the association links and distortion energy of the network. Based on the total energy being above a settable threshold and the system recommends a change in the plurality of workers or change in dynamic the system can perform one or more of the following: i) one or more of the worker links are re-associated between a previously unassociated pair of workers; ii) one or more of the association links to a previously associated pair of tasks in the data space are re-associated between a previously unassociated pair of tasks. The iterative loop as outlined above in the previous paragraph is repeated. In one example, the re-associating automatically re-associates the association link between a previously unassociated pair of the data points in the data space and a worker in response to the re-association resulting in lower total energy.

In another embodiment of the present invention the system takes into account compatibility of the workers using known methods in the related art.

In another embodiment for the present invention the system can determine the training needed to exemplify the cognitive skills needed to accomplish the task.

In another embodiment of the present invention the system calculates the risk associated with the selected workers accomplishing the task according to known methods in the relevant art.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

The invention claimed is:

1. A method for selecting a plurality of workers to accomplish a task by interacting with a cloud computing environment for load-balancing between two or more clouds, the method comprising:
by a processor:
identifying a task from a description;
extracting at least one cognitive skill from the description of the task, the at least one cognitive skill being extracted using:
a machine learning method; and
a question and answering system where the question and answering system outputs an answer itself if a question sentence expression in a natural language is input;
after the extracting, supplying a tag associated with the at least one cognitive skill, the tag specifying one or more cognitive skills that are necessary to accomplish the task and the necessity is labeled by a user;
generating a group cognitive map which includes the at least one cognitive skill; and
selecting a plurality of workers to accomplish the task based on at least the group cognitive map,
wherein the plurality of workers comprises at least one human worker and at least one artificial intelligent (AI) agent that compliments the human worker,
wherein the tag changes over time based on a change in the at least one cognitive skill required to accomplish the task changing over time,
wherein the plurality of workers are selected from an online community, and
wherein the selecting selects an optimal worker from the plurality of workers to accomplish the task by generating an iterative loop over a network to incorporate specific parameters of the task to determine of the optimal worker for the task using an order embedding algorithm, and
wherein the iterative loop is repeated such that, in a second loop, a change in the plurality of workers is recommended to accomplish the task based on a total energy that is computed as a sum of an approximation energy related to association links and distortion energy of the network being less than an adjustable threshold,
further comprising:
evaluating a gain of a task by determining a task quality of the task;
providing a confidence value based on the evaluation of the gain, the confidence value representing a likelihood that the task will be completed on time within given parameters;
recommending a change in the plurality of workers based on the gain of the task quality of the task; and
requesting a supervisor provide a specific change to the task based on the confidence value falling below a threshold value such that the task is completed on time in combination with a revised recommendation of an additional AI agent for addition to the task,
wherein the requesting requests the supervisor provide the specific change to the task via a cloud on-demand self-service running on an application on a graphical-user interface that communicates with the cloud computing environment, and
load-balancing between two or more clouds by using the cloud computing environment, the load-balancing uses a cloud computing model of a service delivery comprising two or more clouds of a private cloud, a community cloud, and a public cloud that remain unique entities but are bound together by technology that enables data and application portability that results in the load-balancing between the two or more clouds.

2. The method of claim 1, wherein the selecting the plurality of workers is based on each of: a budget; a deadline; a location; weather; and any other parameter that can help determine the plurality of workers.

3. The method of claim 2, wherein the selecting the plurality of workers is also based on a compatibility between the plurality of workers.

4. The method of claim 1, wherein the machine learning method comprises Latent Dirchlet Allocation.

5. A system for selecting a plurality of workers to accomplish a task by interacting with a cloud computing environment for load-balancing between two or more clouds, the system comprising:
a memory;
a processor coupled to the memory; and
a cognitive skill selector module coupled to the memory and the processor, wherein the cognitive skill selector module performs a method comprising:
identifying a task from a description;
extracting at least one cognitive skill from the description of the task, the at least one cognitive skill being extracted using:
a machine learning method; and
a question and answering system where the question and answering system outputs an answer itself if a question sentence expression in a natural language is input;
after the extracting, supplying a tag associated with the at least one cognitive skill, the tag specifying one or more cognitive skills that are necessary to accomplish the task and the necessity is labeled by a user;
generating a group cognitive map which includes the at least one cognitive skill; and
selecting a plurality of workers to accomplish the task based on at least the group cognitive map,
wherein the plurality of workers comprises at least one human worker and at least one artificial intelligent (AI) agent that compliments the human worker,
wherein the tag changes over time based on a change in the at least one cognitive skill required to accomplish the task changing over time,
wherein the plurality of workers are selected from an online community, and
wherein the selecting selects an optimal worker from the plurality of workers to accomplish the task by generating an iterative loop over a network to incorporate specific parameters of the task to determine of the optimal worker for the task using an order embedding algorithm, and
wherein the iterative loop is repeated such that, in a second loop, a change in the plurality of workers is recommended to accomplish the task based on a total energy that is computed as a sum of an approximation energy related to association links and distortion energy of the network being less than an adjustable threshold, further comprising:

evaluating a gain of a task by determining a task quality of the task;

providing a confidence value based on the evaluation of the gain, the confidence value representing a likelihood that the task will be completed on time within given parameters;

recommending a change in the plurality of workers based on the gain of the task quality of the task; and requesting a supervisor provide a specific change to the task based on the confidence value falling below a threshold value such that the task is completed on time in combination with a revised recommendation of an additional AI agent for addition to the task, wherein the requesting requests the supervisor provide the specific change to the task via a cloud on-demand self-service running on an application on a graphical-user interface that communicates with the cloud computing environment, and wherein the cloud computing environment comprises a cloud computing model of a service delivery comprising two or more clouds of a private cloud, a community cloud, and a public cloud that remain unique entities but are bound together by technology that enables data and application portability that results in load-balancing between the two or more clouds.

6. The system of claim 5, wherein the plurality of workers are selected from an online community.

7. The system of claim 5, wherein the selecting the plurality of workers is based on each of: a budget; a deadline; a location; weather; and any other parameter that can help determine the plurality of workers.

8. The system of claim 7, wherein the selecting the plurality of workers is also based on a compatibility between the plurality of workers.

9. The system of claim 5, wherein the machine learning method comprises Latent Dirchlet Allocation.

10. A computer program product for selecting a plurality of workers to accomplish a task by interacting with a cloud computing environment for load-balancing between two or more clouds, the computer program product comprising a non-transitory computer readable storage medium having program instructions embodied therewith, the program instructions executable by a processor to cause the processor to perform:

identifying a task from a description;

extracting at least one cognitive skill from the description of the task, the at least one cognitive skill being extracted using:
a machine learning method; and
a question and answering system where the question and answering system outputs an answer itself if a question sentence expression in a natural language is input;

after the extracting, supplying a tag associated with the at least one cognitive skill, the tag specifying one or more cognitive skills that are necessary to accomplish the task and the necessity is labeled by a user;

generating a group cognitive map which includes the at least one cognitive skill; and selecting a plurality of workers to accomplish the task based on at least the group cognitive map, wherein the plurality of workers comprises at least one human worker and at least one artificial intelligent (AI) agent that compliments the human worker, wherein the tag changes over time based on a change in the at least one cognitive skill required to accomplish the task changing over time, wherein the plurality of workers are selected from an online community, and wherein the selecting selects an optimal worker from the plurality of workers to accomplish the task by generating an iterative loop over a network to incorporate specific parameters of the task to determine of the optimal worker for the task using an order embedding algorithm, and wherein the iterative loop is repeated such that, in a second loop, a change in the plurality of workers is recommended to accomplish the task based on a total energy that is computed as a sum of an approximation energy related to association links and distortion energy of the network being less than an adjustable threshold, further comprising:

evaluating a gain of a task by determining a task quality of the task;

providing a confidence value based on the evaluation of the gain, the confidence value representing a likelihood that the task will be completed on time within given parameters;

recommending a change in the plurality of workers based on the gain of the task quality of the task; and requesting a supervisor provide a specific change to the task based on the confidence value falling below a threshold value such that the task is completed on time in combination with a revised recommendation of an additional AI agent for addition to the task, wherein the requesting requests the supervisor provide the specific change to the task via a cloud on-demand self-service running on an application on a graphical-user interface that communicates with the cloud computing environment, and wherein the cloud computing environment comprises a cloud computing model of a service delivery comprising two or more clouds of a private cloud, a community cloud, and a public cloud that remain unique entities but are bound together by technology that enables data and application portability that results in load-balancing between the two or more clouds.

11. The computer program product of claim 10, wherein the plurality of workers are selected from an online community.

12. The computer program product of claim 10, wherein the selecting the plurality of workers is based on each of: a budget; a deadline; a location; weather; and any other parameter that can help determine the group of workers.

13. The computer program product of claim 12, wherein the selecting the plurality of workers is also based on a compatibility of the plurality of workers.

* * * * *